United States Patent [19]

Wank et al.

[11] Patent Number: 4,489,168

[45] Date of Patent: Dec. 18, 1984

[54] COMPOSITION OF MATTER FOR USE IN MANUFACTURING NON-MAGNETIC PARTS OF A MAGNETIC HEAD AND METHOD OF MANUFACTURING THE COMPOSITION

[75] Inventors: Larry A. Wank, Cornwallville; Joseph G. Braitling, Saugerties, both of N.Y.

[73] Assignee: North American Philips Corporation, New York, N.Y.

[21] Appl. No.: 546,071

[22] Filed: Oct. 27, 1983

Related U.S. Application Data

[63] Continuation of Ser. No. 335,915, Dec. 30, 1981, abandoned.

[51] Int. Cl.$^3$ ............................................. C04B 35/46
[52] U.S. Cl. .................................. 501/134; 501/135; 501/136
[58] Field of Search ..................... 501/104, 134–136; 106/300, 306

[56] References Cited

FOREIGN PATENT DOCUMENTS

P3515   5/1953   Fed. Rep. of Germany ...... 501/135
598038  2/1948   United Kingdom ................ 501/135

*Primary Examiner*—James Poer
*Attorney, Agent, or Firm*—Robert S. Smith

[57] ABSTRACT

A nonmagnetic material for use in a magnetic head which has a composition which, by weight, is between 10 and 30% calcium oxide and between 70 and 90% titanium dioxide and up to 2% zirconium dioxide. The invention also includes a method of manufacturing a nonmagnetic material which comprises the steps of providing a quantity of calcium oxide, providing a quantity of titanium dioxide, and milling said calcium oxide and titanium dioxide with zirconium dioxide balls to produce a mixture which includes zirconium dioxide.

3 Claims, 2 Drawing Figures

COMPOSITION OF MATTER FOR USE IN MANUFACTURING NON-MAGNETIC PARTS OF A MAGNETIC HEAD AND METHOD OF MANUFACTURING THE COMPOSITION

This is a continuation of application Ser. No. 335,915, filed Dec. 30, 1981, now abandoned.

This application is related to a copending U.S. patent application filed on the same day by the same inventors for a magnetic head construction.

BACKGROUND OF THE INVENTION

The invention relates to the materials used in magnetic heads and a method of preparing the composition that has been found to be particularly desirable. More particularly, the invention relates to the materials for the slider or other non-magnetic structure which is commonly used to mount the pole pieces of a magnetic head which is used for data processing applications. The term slider will be understood to be a portion of a magnetic head which contacts the floppy disc surface while supporting the core or cores. Substantial progress has been made in improving magnetic and mechanical properties of magnetic heads. Many magnetic heads used in data processing applications are manufactured with glass bonded pole pieces in the manner described in Peloschek et al, U.S. Pat. No. 3,246,383. Although the present invention may advantageously be used with such heads, it will be understood that it also has application to other magnetic heads. Such other magnetic heads may be manufactured by sputtering or other techniques. A mechanical problem associated with the fabrication of magnetic heads is the maintenance of precise position relationship between the pole pieces of the magnetic head. The maintenance of the magnetic gap dimensions is of critical importance in either reading or writing data from or to a magnetic media.

The magnetic gap dimensions may change, for example, due to the effect of different coefficients of thermal expansion between the ferrite pole pieces and the structure which mounts the pole pieces. The structure used to mount the ferrite pole pieces, at least in structures intended for use with floppy disc drive assemblies, is typically identified as a slider.

It is object of the invention to provide a composition of matter for the slider which will minimize differential coefficient of expansion between the pole pieces and the slider particularly in a manganese-zinc ferrite recording head.

It is another object of the invention to provide a method of manufacturing the material which has been found to be particularly suitable for manufacturing slider elements.

It is another object of the invention to provide the means by which the magnetic gap physical properties may be maintained and thus to faciliate maximum data density.

SUMMARY OF THE INVENTION

It has been found that these and other objects of the invention may be attained with a nonmagnetic material for use in a magnetic head which comprises, by weight, between 10 and 30% calcium oxide and between 70 and 90% titanium dioxide and up to 2% zirconium dioxide. In some forms the composition by weight is between 15 and 25% calcium oxide and between 75 and 85% titanium dioxide.

The composition of matter may be formed by mixing approximately 19% calcium oxide and 81% titanium dioxide and milling with zirconium dioxide balls.

The method of manufacturing the nonmagnetic material includes the steps of providing a quantity of calcium oxide, providing a quantity of titanium dioxide, and milling the calcium oxide and titanium dioxide with zirconium dioxide balls to produce a mixture which includes zirconium dioxide.

BRIEF DESCRIPTION OF THE DRAWINGS

The invention will be better understood by reference to the accompanying drawing in which.

DESCRIPTION OF THE PREFERRED EMBODIMENT

Figure 1:
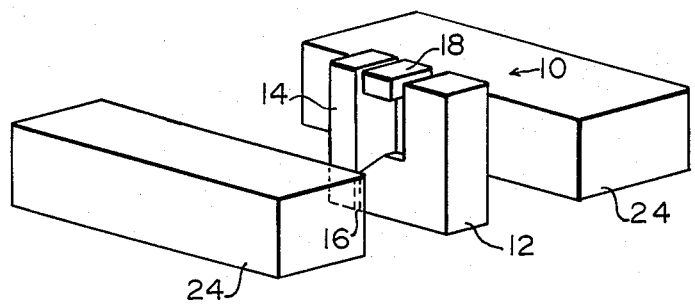
FIG. 1 is a partially schematic perspective view of the read and write core shown in exploded relationship with respect to the sliders of a typical magnetic head.
Figure 2:
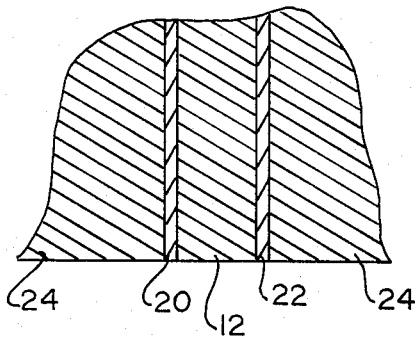
FIG. 2 is a sectional view of a portion of the sliders and pole pieces illustrated in FIG. 1 with the elements bonded together by glass bonding.

Referring now to FIGS. 1 and 2 there is shown a read and write core assembly 10 which includes pole pieces 12, 14 having a magnetic gap 16 disposed between them. The pole pieces 12, 14 are bonded together by glass bonding (not shown) which also bonds a back bar 18 intermediate the pole pieces 12, 14. The pole pieces 12, 14 are also bonded by glass bonding 20, 22 to a slider which will ordinarily substantially surround the core assembly 10 except for the lowermost (as viewed in FIG. 1 face thereof) which has the magnetic gap 16 therein and which is positioned proximate to an associated magnetic media (not shown) in use.

It is the magnetic gap 16 which must be manufactured with precise dimensional characteristics and must not be distorted during the life of the apparatus. The pole pieces 12, 14 typically are manufactured of a manganese-zinc (Mn-Zn) material because this ferromagnetic alloy has been found to be generally superior to nickel-zinc magnetic recording heads for many applications. The desired material for the slider 24 or in other magnetic head constructions where the ferrite material is mounted on a nonmagnetic material must have a coefficient of expansion which is very close to that of the manganese-zinc ferrite. The non-magnetic material must also lend itself to conventional manufacturing processes.

When the slider is manufactured of calcium oxide (CaO) and titanium dioxide ($TiO_2$) to which a small amount of zirconium dioxide ($ZrO_2$) has been added the desired mechanical properties for the slider and other similar non-magnetic elements is achieved. More specifically, the material has substantially the same hardness as the ferrite material and also has a characteristic of substantially the same removal rate during lapping operations as the ferrite. Since it is customary to lap the entire core assembly 10 and with the slider 24 it is desirable to have substantially the same removal rate so that the parts will maintain substantially a coplanar relationship after continued lapping.

The material for the slider is prepared in the preferred method by mixing calcium oxide and titanium dioxide in the respective weight percentages of 18.96% and 81.04%. These materials are then placed in a high alumina vessel and ground with zirconium balls. The grinding is continued until the particle size is substantially homogeneous and also so that the material is reactive enough so that a bar may be formed which is fully sintered. In some cases hot isostatic pressing may be utilized to optimize the mechanical properties of the slider or other nonmagnetic structure.

In various embodiments of the invention the initial quantity of calcium oxide may be between 10 and 30% and the initial quantity of titanium dioxide may be between 70 and 90% by weight. The percentage of zirconium dioxide in the final composition may be up to 2% by weight. It will be understood that this material is added to the mixture as a result of the grinding process and is removed from the balls which are used in the grinding or milling process. The percentages by weight of calcium oxide and titanium dioxide, in the final mixture, will thus be approximately the same as the initial quantities.

What is claimed:

1. A nonmagnetic material for use in a magnetic head which consists of a composition which, by weight, is between 10 and 30% calcium oxide and between 70 and 90% titanium dioxide and more than 0% and up to 2% zirconium dioxide.

2. A composition of matter as described in claim 1 wherein said matter has, by weight, between 15 and 25% calcium oxide and between 75 and 85% titanium dioxide.

3. The composition of matter as described in claim 2 wherein said material is formed by mixing approximately 19% calcium oxide and 81% titanium dioxide and milling with zirconium dioxide balls.

* * * * *